US012614412B2

(12) United States Patent
Lim et al.

(10) Patent No.: US 12,614,412 B2
(45) Date of Patent: Apr. 28, 2026

(54) AUTOMATED VEHICLE COMMUNICATIONS AND SERVICING SYSTEM

(71) Applicant: Rivian IP Holdings, LLC, Plymouth, MI (US)

(72) Inventors: Choon Lim, Costa Mesa, CA (US); Harsh Mujoo, Mountain View, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 143 days.

(21) Appl. No.: 18/091,132

(22) Filed: Dec. 29, 2022

(65) Prior Publication Data
US 2023/0386263 A1 Nov. 30, 2023

Related U.S. Application Data

(60) Provisional application No. 63/346,778, filed on May 27, 2022.

(51) Int. Cl.
| | |
|---|---|
| *G07C 5/00* | (2006.01) |
| *G06F 16/2458* | (2019.01) |
| *G07C 5/08* | (2006.01) |
| *H04L 67/12* | (2022.01) |

(52) U.S. Cl.
CPC ......... *G07C 5/008* (2013.01); *G06F 16/2471* (2019.01); *G07C 5/0808* (2013.01); *G07C 5/0816* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 2008/0255721 A1* | 10/2008 | Yamada | ................. | G07C 5/008 |
| | | | | 701/31.4 |
| 2015/0094903 A1* | 4/2015 | Bell | ...................... | G07C 5/0808 |
| | | | | 701/1 |
| 2016/0035150 A1* | 2/2016 | Barfield, Jr. | ....... | G05B 23/0254 |
| | | | | 701/29.3 |
| 2018/0336742 A1* | 11/2018 | Geeroms | .............. | G07C 5/0808 |
| 2019/0031203 A1* | 1/2019 | Fox | ..................... | G06F 11/0721 |
| 2019/0279447 A1* | 9/2019 | Ricci | .................... | B60N 2/0022 |
| 2021/0103288 A1* | 4/2021 | Nemedi | ............... | G06Q 10/047 |

* cited by examiner

*Primary Examiner* — James J Lee
*Assistant Examiner* — Andrew Sang Kim
(74) *Attorney, Agent, or Firm* — HG LAW LLP

(57) ABSTRACT

Systems and methods include a communications interface configured to communicate with a network system configured to communicate with a plurality of vehicles, and control circuitry configured to receive a query from the network system, determine vehicle information based on the query, and transmit the vehicle information to the network system.

18 Claims, 7 Drawing Sheets

300

400

401
CLOUD SYSTEM

402
MANAGE VEHICLE COMMUNICATION (E.G., QUERY VEHICLE FOR FAULT/ PERFORMANCE ISSUE; COMMUNICATE STATUS; COMMUNICATE VEHICLE HEALTH TO CLOUD)

404
MANAGE NOTIFICATIONS (E.G., PRIORITIZE, GENERATE)

406
NOTIFY USER; MANAGE SERVICE

410
MANAGE USER ACCOUNT (E.G., USING OCS)

412
PROVIDE SENSOR INFORMATION (E.G., USING OCS)

500

502
QUERY DECENTRALIZED IDENTIFIER; DETERMINE METRICS; COMMUNICATE DATA TO CLOUD SYSTEM; SEND DATA TO XMM

504
PRIORITIZE NOTIFICATIONS (E.G., USING CGM)

506
DISPLAY NOTIFICATIONS (E.G., USING XMM)

510
MANAGE USER ACCOUNT (E.G., USING OCS)

412
PROVIDE SENSOR INFORMATION (E.G., USING OCS)

AUTOMATED VEHICLE COMMUNICATIONS AND SERVICING SYSTEM

CROSS-REFERENCE TO RELATED APPLICATION

This application claims the benefit of U.S. Provisional Patent Application No. 63/346,778 filed May 27, 2022, the disclosure of which is hereby incorporated by reference herein in its entirety.

INTRODUCTION

The present disclosure is directed to an automated vehicle communications system and, more particularly, methods and systems for managing vehicle or component issues and servicing issues.

SUMMARY

The present disclosure is directed to systems and methods for managing vehicle diagnosing issues, performance issues, communications issues, and service issues. To illustrate, there may be a few challenges when a vehicle issue is identified. For example, one challenge may be quickly and accurately identifying vehicles affected by the issue. If done manually, this may require multiple parties to determine which vehicle(s) was/were affected during manufacturing, which may be open to error. In a further example, this may require communicating to the customer that they are affected by, or potentially affected by, the issue, which, if done via mail, may be open to error as the customer may have moved. In a further example, this may require organizing vehicle repairs or servicing, which can be time consuming and typically requires human-to-human interaction to organize.

The system and methods of the present disclosure may be implemented by control circuitry of the vehicle, a remote device (e.g., a cloud system, a server), or a combination thereof. These system and methods may improve the speed of informing a user of a vehicle issue, and the speed and precision of knowing and tracking how many vehicles (e.g., and which vehicles) have been affected and how many have been fixed, diagnosed, or serviced and allow saving resources (e.g., headcount) by having vehicle issues managed by an automatic process. For example, by managing the set of vehicles that receive notifications, the servicing and tracking may be performed more efficiently. To illustrate, the vehicle issue (e.g., a characteristic, state, or behavior) may include a performance issue with a component or subsystem of the vehicle, and may correspond to a servicing issue (e.g., a replacement, adjustment, measurement, verification, test, or any other suitable servicing action to be performed) that address the vehicle issue, if present.

In some embodiments, the system (e.g., control circuitry of the vehicle, a cloud server) may include instructions for running a diagnostics function/algorithm on the vehicle to query and determine if an issue is present on the vehicle. In some embodiments, the system (e.g., control circuitry of the vehicle, a cloud server) may include instructions for running a diagnostics function/algorithm configured to automatically detect if servicing and/or diagnosing have been performed (e.g., fixed) or otherwise addressed.

In some embodiments, the system (e.g., control circuitry of the vehicle) may monitor operation of the vehicle and identify malfunctioning components or systems, faulted components or systems, damaged components or systems, or otherwise flagged components or systems that require inspection, repair, servicing, or replacement.

In some embodiments, a communication system is configured to utilize the vehicles dash display (e.g., center display) to quickly inform the user that they are affected by the issue.

In some embodiments, cloud system is configured to create and track a list of vehicles affected by an issue, determine if they have been fixed, or a combination thereof. For example, each vehicle has at least one associated identifier (e.g., a VIN, a serial number, a network address), and the cloud system may manage a database of the vehicles, any issues that may affect the vehicles (e.g., for each vehicle), a status (e.g., fixed, not fixed, notified, scheduled), any other suitable information, or any combination thereof.

In some embodiments, an automatic service system is configured to allow the user to call a vehicle servicer via their vehicle and also automatically schedule a service for their vehicle to have the diagnosing and/or servicing performed.

In some embodiments, the present disclosure is directed to a method for managing vehicle issues. In some embodiments, the method includes determining a vehicle issue corresponding to at least one type of vehicle, identifying a plurality of vehicles of the at least one type that may include the vehicle issue, querying each vehicle of the plurality of vehicles, analyzing query responses from the plurality of vehicles, and determining a set of vehicles from the plurality of vehicles potentially affected by the issue based on the query responses. In some embodiments, the method includes gathering data from a plurality of vehicles, determining a vehicle issue or potential vehicle issue based on the gathered data, and generating notifications for the plurality of vehicles indicative of the vehicle issue.

In some embodiments, analyzing the query responses includes extracting data from each of the query responses, performing statistical analysis based on the data, and identifying an issue based on the statistical analysis. For example, the issue may be a servicing issue that corresponds to the vehicle issue.

In some embodiments, the method includes identifying an issue that may correspond to the at least one type of vehicle. In some such embodiments, querying each vehicle of the plurality of vehicles includes requesting data corresponding to the vehicle issue, and analyzing the query responses from the plurality of vehicles includes analyzing the data corresponding to the vehicle issue.

In some embodiments, the vehicle issue corresponds to a subsystem of each vehicle of the plurality of vehicles. In some such embodiments, analyzing the query responses includes analyzing data gather by at least one sensor of each vehicle corresponding to the subsystem, and identifying a metric indicative of a potential malfunction associated with the subsystem. In some embodiments, determining the set of vehicles includes comparing the data (e.g., from query responses by each vehicle) and the metric.

In some embodiments, querying each vehicle includes transmitting a firmware update to each vehicle. The firmware update may include instructions for processing data gathered by the vehicle. In some embodiments, the method includes receiving the query responses from each vehicle, with each query response including vehicle operating information.

In some embodiments, the method includes identifying a servicing entity for one or more vehicles of the set of vehicles, and determining schedule information for servicing the one or more vehicles.

In some embodiments, the method includes transmitting a notification indicative of the issue and/or fix to each vehicle of the set of vehicles, and tracking vehicle servicing for each vehicle of the set of vehicles. In some embodiments, determining the set of vehicles includes identifying a set of user accounts corresponding to the vehicle issue, transmitting a notification indicative of the issue to at least one device associated with each user account of the set, and tracking vehicle servicing for each vehicle corresponding to the set of user accounts. In some embodiments, querying each vehicle of the plurality of vehicles includes gathering vehicle data corresponding to subsystems of each vehicle, analyzing the query responses includes determining an issue based on the gathered data. In some embodiments, the method includes transmitting a notification to each vehicle of the set indicative of the issue, and scheduling, for each vehicle of the set, a vehicle servicing at a vehicle servicer based on the issue.

In some embodiments, the present disclosure is directed to a system that includes a communications interface configured to communicate with a network system configured to communicate with a plurality of vehicles, and control circuitry configured to implement any or all of the methods of the present disclosure. In some embodiments, the present disclosure is directed to non-transitory computer readable media having instructions stored thereon that, when executed by control circuitry, implement any or all of the methods of the present disclosure.

In some embodiments, the present disclosure is directed to a system associated with a vehicle (i.e., a vehicle system). The system includes a communications interface configured to communicate with a cloud system, and control circuitry configured to receive vehicle information for the vehicle (e.g., from a network device), and schedule a vehicle service based on the vehicle information. In some embodiments, the present disclosure is directed to a system associated with a vehicle that includes a communications interface configured to communicate with a cloud system, and control circuitry configured to receive a query from a cloud system, determine vehicle information based on the query, and transmit the vehicle information to the cloud system. The vehicle information may include data gathered by the system and corresponding to one or more subsystems of the vehicle. In some embodiments, the control circuitry is configured to gather data from subsystems of the vehicle, transmit the data to the cloud system, and respond to queries from the cloud system. In some embodiments, the control circuitry is configured to gather vehicle data corresponding to subsystems of a vehicle, transmit the vehicle data to a cloud system, receive vehicle information from the cloud system, and determine a response to the vehicle information.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DESCRIPTION

Figure 1:
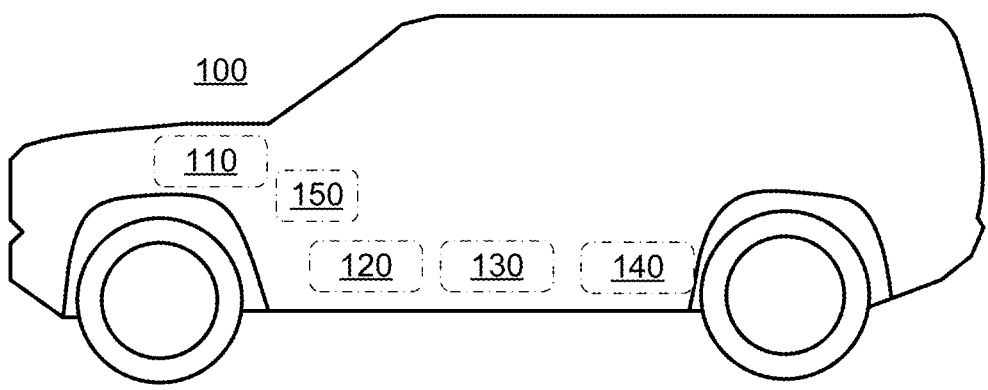
FIG. 1 shows a side view of an illustrative vehicle having controllers and an interface, in accordance with some embodiments of the present disclosure.

FIG. 1 shows a side view of illustrative vehicle 100 having subsystems 110, 120, 130, and 140 and interface 150, in accordance with some embodiments of the present disclosure. For example, subsystems 110, 120, 130, and 140, which may each include one or more ECUs, may correspond to, for example, a battery system, a motor control system, a cabin air system, a cooling system, a suspension system, an autonomous vehicle system, a user interface, or a combination of subsystems. Interface 150 may include a central controller (e.g., that communicates with and manages other controllers), a user interface, a communications interface, or any combination thereof. Controllers of each of subsystems 110, 120, 130, and 140 may be configured to check for errors, perform diagnostic checks, query a remote vehicle manager (e.g., of a cloud system or vehicle servicer), respond to signals from a vehicle manager (e.g., of a cloud system or vehicle servicer), or a combination thereof. In an illustrative example, controllers of each of subsystems 110, 120, 130, and 140 may be coupled to a communications bus (e.g., a CAN bus) and may be configured to generate messages and address signals over the bus. In a further example, a central controller may be configured to communicate with the other controllers to transmit error information, generate one or more error flags, trouble codes, or any other suitable indicators or combination of indicators, and transmit the indicator via a communications bus.

Figure 2:
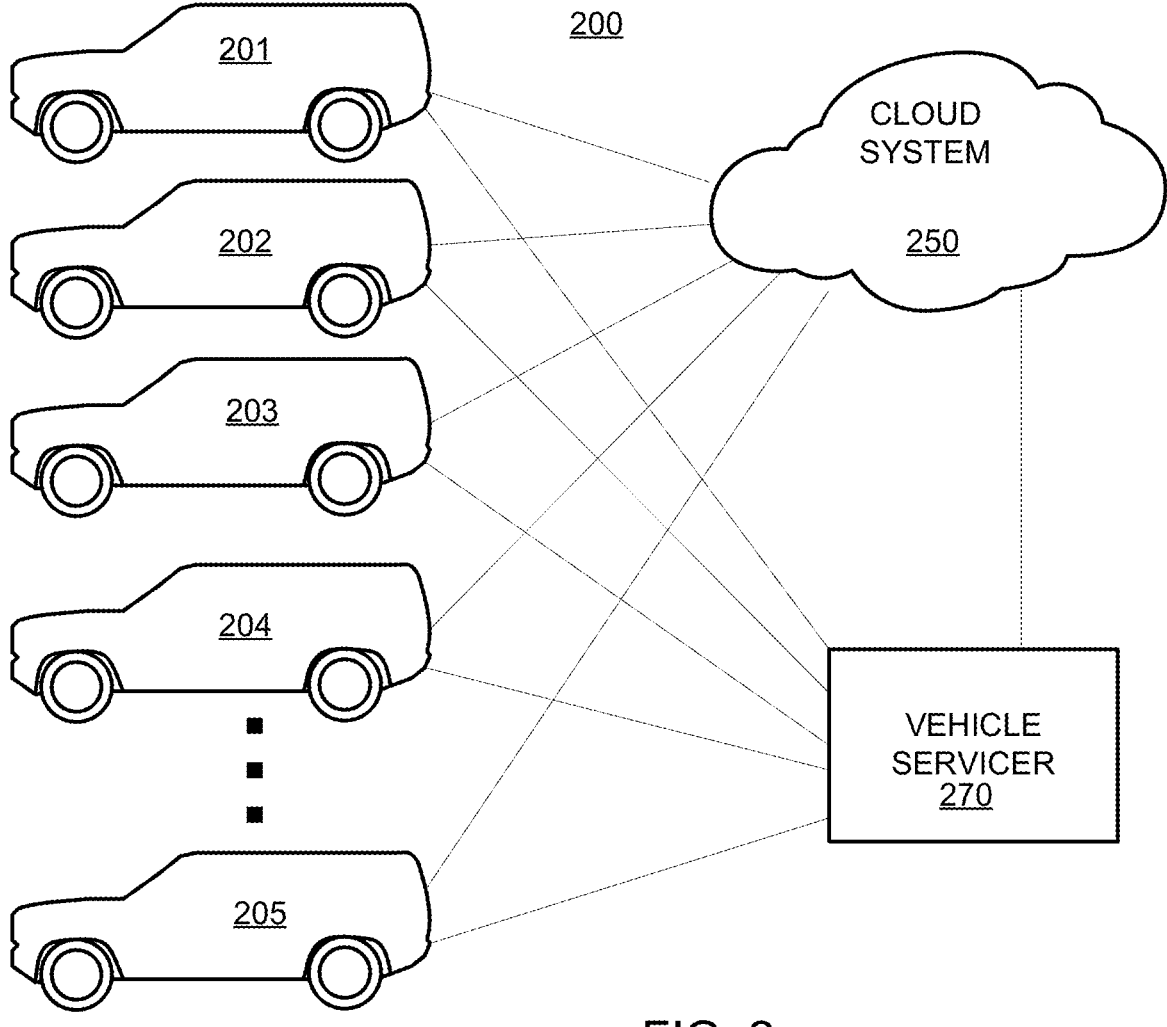
FIG. 2 shows an illustrative plurality of vehicles, a cloud system, and a vehicle servicer, in accordance with some embodiments of the present disclosure.

FIG. 2 shows an illustrative plurality of vehicles 201-205, cloud system 250, and vehicle servicer 270, in accordance with some embodiments of the present disclosure. For example, each of vehicles 201-205 may include components and subsystems (e.g., each may be an instance of vehicle 100, or any other suitable vehicle). To illustrate, each of vehicles 201-205, may be in operation, in the field, or otherwise out of manufacturer/distributer possession, and may be subject to an entire vehicle servicing, an inspection to determine vehicle information, or a recall of one or more components or subsystems. In some embodiments, each of vehicles 201-205 is configured to communicate with a central system, cloud system 250, vehicle servicer 270, or a combination thereof, to determine whether any issues exist (e.g., whether servicing has been recommended). For example, any or all of vehicles 201-205 may query a remote system (e.g., cloud system 250, vehicle servicer 270), the remote system may push information to vehicles 201-205, or both.

In some embodiments, cloud system 250 is configured to determine a set of vehicles corresponding to an issue (e.g., some or all of vehicles 201-205), transmitting a notification to each vehicle of the set indicative of the issue, and track vehicle servicing (e.g., as performed by vehicle servicer 270) for each vehicle of the set of vehicles. To illustrate, a plurality of vehicles, which may include thousands of vehicles (e.g., of which vehicles 201-205 belong), may each include a subsystem (e.g., any of subsystems 110, 120, 130, or 140 of FIG. 1). If cloud system 250 determines an issue corresponding to any of the subsystems of the plurality of vehicles, cloud system 250 may generate and transmit a notification to each vehicle. In an illustrative example, cloud system 250 may implement a thin client manager (TCM) configured to transmit decentralized identifier (DID) queries, and receive responses (e.g., that may include vehicle data).

In some embodiments, cloud system 250 is configured to identify a set of user accounts corresponding to an issue, transmit, for each user account of the set, a notification indicative of the issue to at least one device associated with the user account, and track vehicle servicing (e.g., by vehicle servicer 270) for each vehicle corresponding to the set of user accounts. To illustrate, a plurality of vehicles, which may include thousands of vehicles (e.g., of which vehicles 201-205 belong), may each be associated with a user account. For example, an individual vehicle owner may create an account (e.g., which may be authenticated), associate a user device (e.g., a smart phone, a laptop, a tablet, an interface of the vehicle) with the user account, associate a vehicle with the user account, send and receive information corresponding to the vehicle to and from cloud system 250, send and receive information corresponding to the vehicle to and from vehicle servicer 270, or a combination thereof. In some embodiments, cloud system 250 may host, provide a backend for, function as an application server for, generate an application programming interface (API) for, or a combination thereof, or otherwise provide an application with which the user or user account may interact. If cloud system 250 determines an issue corresponding to any of the subsystems of the plurality of vehicles, cloud system 250 may generate and transmit a notification for each user account. The corresponding user may be notified by the notification and then schedule inspection or servicing from vehicle servicer 270.

In some embodiments, cloud system 250 is configured to gather vehicle data from a plurality of vehicles (e.g., corresponding to subsystems of each vehicle), determine an issue (e.g., based on the gathered vehicle data), and determine a set of the plurality of vehicles corresponding to the issue. In response to determining the issue, cloud system 250 may transmit a notification (e.g., to each vehicle of the set such as vehicles 201-205) indicative of the issue, schedule a vehicle servicing at a vehicle servicer based on the issue for each vehicle of the set, or a combination thereof.

In some embodiments, each of vehicles 201-205 is configured to gather vehicle data corresponding to its subsystems, transmit the vehicle data to cloud system 250, receive vehicle information from cloud system 250, and determine a response to the vehicle information. For example, each of vehicles 201-205 may include one or more sensors configured to sense one or more operating characteristics and generate sensor signals, and memory to store data gathered from the sensor signals. The one or more operating characteristics may include, for example, temperature, pressure, current, voltage, impedance, vibration, any other suitable characteristic, any calculation or determination based thereon, or any combination thereof. As cloud system 250 gathers data from a plurality of vehicles (e.g., including vehicles 201-205), cloud system 250 may be able to identify patterns or behavior that correspond to a performance issue (e.g., actual performance differing from expected performance). For example, because cloud system 250 may be able to perform statistical analysis using data from a sample size that includes the plurality of vehicles in operation in the field, cloud system 250 may be able to better identify potential issues.

Figure 3:
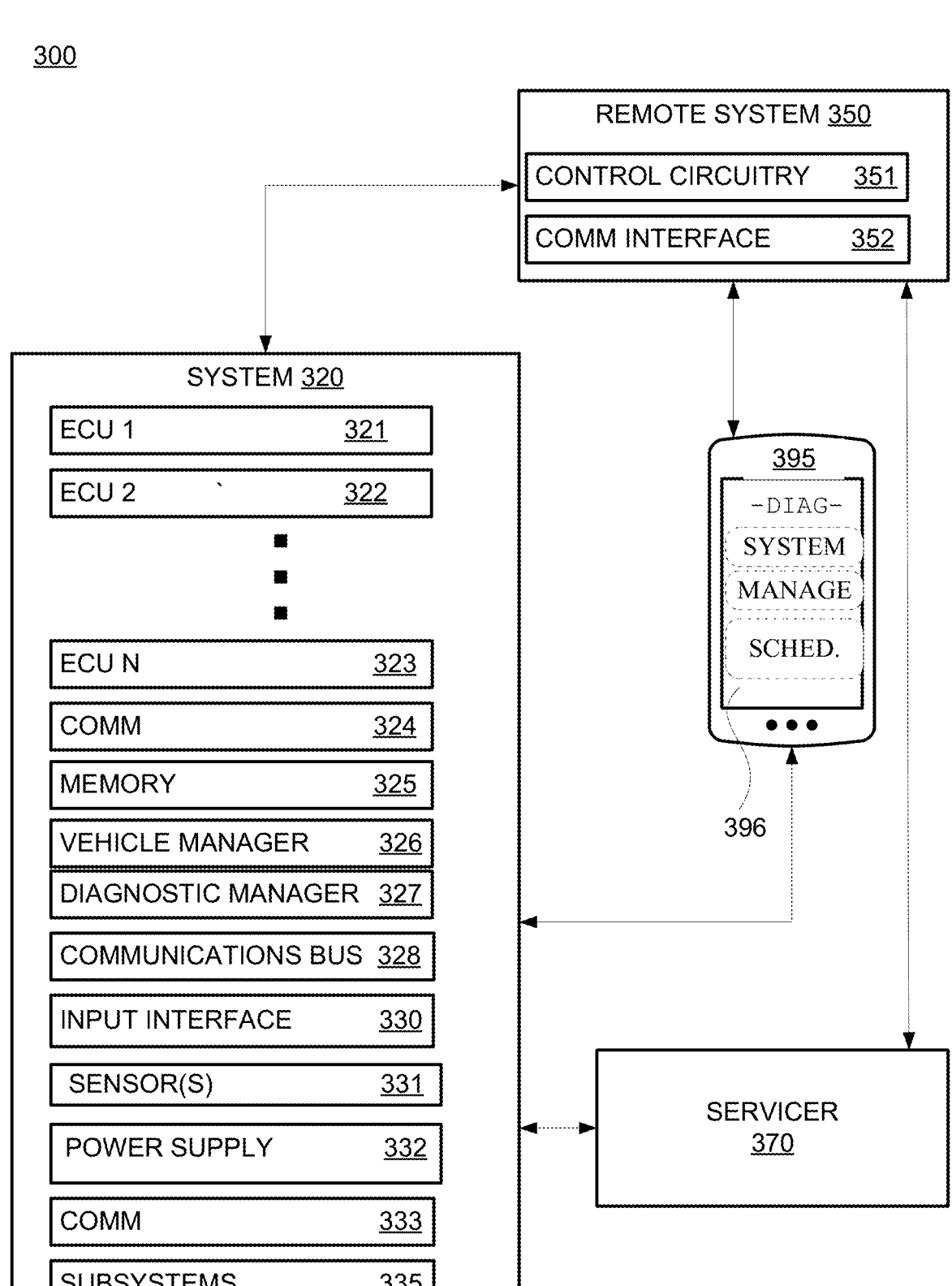
FIG. 3 shows a block diagram of an illustrative system for checking and managing vehicle information, in accordance with some embodiments of the present disclosure.

FIG. 3 shows a block diagram of illustrative system 300 for checking and managing vehicle information, in accordance with some embodiments of the present disclosure. As illustrated, system 300 includes system 320 (e.g., of a vehicle), remote system 350, and device 395. System 320, illustrated, includes ECUs 321-323 (e.g., a total of N ECUs), memory 325, vehicle manager 326, diagnostic manager 327, communications bus 328, input interface 330, sensors 331, power supply 332, communications interface 333 (comm 333), and one or more subsystems 335, and may include any other suitable components in accordance with the present disclosure. For example, system 320 may be a vehicle that may be configured to communicate with remote system 350, device 395, any other suitable devices, or any combination thereof. In some embodiments, ECUs 321-323 may be included in (e.g., distributed among or embedded as part of) one or more of subsystems 335.

Each of ECUs 321, 322, and 323 (and any other suitable ECUs of system 320) may include control circuitry, which may include a processor, a communications bus, memory, power management circuitry, a power supply, any suitable components, or any combination thereof. Memory 325 may include solid state memory, a hard disk, removable media, any other suitable memory hardware, or any combination thereof. In some embodiments, memory 325 is non-transitory computer readable media configured to store computer instructions that, when executed, perform at least some steps of managing servicing and/or diagnosing a vehicle issue.

System 320 may include an antenna and other control circuitry, or any combination thereof, and may be configured to access the internet, a local area network, a wide area network, a Bluetooth-enable device, an NFC-enabled device, any other suitable device using any suitable protocol, or any combination thereof. In some embodiments, system 320 includes or otherwise is coupled to input interface 330, which may include, for example, a screen, a touchscreen, a touch pad, a keypad, one or more hard buttons, one or more soft buttons, a microphone, a speaker, any other suitable components, or any combination thereof. For example, in some embodiments, input interface 330 includes all or part of a dashboard, including displays, dials and gauges (e.g., actual or displayed), soft buttons, indicators, lighting, and other suitable features. In a further example, input interface 330 may include one or more hard buttons arranged at the exterior of the vehicle, interior of the vehicle (e.g., at the dash console), or at a dedicated keypad arranged at any suitable position. In a further example, input interface 330 may be configured to receive input from device 395, haptic input from a user, or both. In a further example, input interface 330 may be configured to display vehicle information, scheduling information, interactive graphics, messages (e.g., warnings, notifications, alerts), any other suitable information, or any combination thereof such that a user may be alerted to or otherwise be able to access vehicle information.

Comm 333 may include one or more ports, connectors, input/output (I/O) terminals, cables, wires, a printed circuit board, control circuitry, any other suitable components for communicating with other units, devices, or components, or any combination thereof. In some embodiments, subsystems 335 may include a drivetrain (e.g., control an engine, electric motor, transmission, brake), cooling system, cabin air system, braking system, autonomous control system, steering system, suspension system, control or manage a battery system (e.g., in addition to are including power supply 332), determine status information of the vehicle or components thereof, communicate with other units, perform any other suitable actions, or any combination thereof. In some embodiments, comm 333, input interface 330, or both, may be configured to send and receive wireless information between system 320 and external devices such as, for example, network devices (e.g., a server, a WiFi access point), device 395 (e.g., a user device such as a smart phone, or a handheld OBD II reader), keyfobs, any other suitable devices, or any combination thereof.

Power supply 332 may include, for example, a vehicle battery pack that may include a plurality of battery cells (e.g., power supply 332 may be included in subsystems 335). For example, power supply 332 may include battery cells, busbars, current collectors, enclosures, DC bus cables or otherwise conductors, contactors, switches, sensors and instrumentation, any other suitable components, or any combination thereof.

As illustrated, device 395 includes several soft buttons 396, each corresponding to a particular function associated with vehicle management for system 320. When one of soft buttons 396 is selected, control circuitry of device 395 may receive a signal that corresponds to the button press (e.g., from an electrical switch or sensor coupled to the button), and in response generate a message or otherwise signal for transmitting to a communications interface of system 320 (e.g., comm 333). In an illustrative example, the user may select an application implemented on device 395 to manage vehicle issues, implemented by vehicle manager 326 of system 320. As illustrated, soft buttons 396 include a "DIAG" button (e.g., to identify performance issues or other issues, component warnings), a "SYSTEM" button (e.g., to identify which system is affected by the vehicle issue or servicing issue), and a "SCHED" button to schedule service, software/firmware updates, or replacement of components of system 320 (e.g., to replace or repair a vehicle or components thereof) with a vehicle servicing entity (e.g., a business, a location, or a mobile servicer). In some embodiments, any of soft buttons 396 or functionality of device 395 may be implemented using input interface 330, system 320, or a combination thereof. For example, a user may manage indications at input interface 330 rather than on a separate user device (e.g., device 395).

Remote system 350, as illustrated, includes control circuitry 351 and communications interface 352. Remote system 350 may include a server or other suitable network device configured to maintain information about a plurality of vehicles (e.g., of which system 320 may be one) such as, for example, identification information (e.g., a VIN, serial number, component serial number), owner information (e.g., an owner ID, name), location information (e.g., using GPS information, street address, zip code, and/or other information), service information (e.g., service history, estimated routine services), impending or initiated fixes (e.g., diagnosing and/or servicing), or a combination thereof. As illustrated, remote system 350 may interact with system 320 (e.g., via comm 333 or communications bus 328 thereof), device 395 (e.g., via WiFi, 3G, 4G, or 5G), or both. In some embodiments, remote system 350 may include a vehicle manager (e.g., vehicle manager 326 may be integrated as part of, or implemented by, remote system 350, in addition to or instead of system 320). For example, control circuitry 351 may be configured to implement the vehicle manager, and communicate with a plurality of vehicles using communications (comm) interface 352.

In an illustrative example, system 320 may include control circuitry and computer instructions to implement vehicle manager 326. Vehicle manager 326 may be configured to generate and transmit a signal or message via comm 333 to remote system 350 to determine whether any vehicle issues have been identified. For example, vehicle manager 326 may query remote system 350 at a predetermined frequency (e.g., daily, weekly, monthly), in response to an event (e.g., vehicle startup, performance issue with a component, error associated with a component), at predetermined times, any other suitable time, or any combination thereof. In some embodiments, vehicle manager 326 may be configured to receive signals from remote system 350. For example, remote system 350 may generate and transmit messages at a predetermined frequency (e.g., daily, weekly, monthly), in response to an event (e.g., initiation of a servicing prompt), at predetermined times, any other suitable time, or any combination thereof. In a further example, remote system 350 may be configured to communicate with a vehicle servicing system to schedule the issue fix or vehicle service. In some embodiments, device 395 may implement a vehicle application to manage vehicle issues. For example, device 395 may be linked to system 320 (e.g., the app on device 395 is associated with an identifier of system 320), and may query remote system 350, receive information from remote system 350, or both, to identify and manage vehicle issues and servicing issues.

In some embodiments, a manufacturer of the vehicle or a component thereof determines that one or more components, systems, sensors, or aspects of the vehicle require diagnosing, testing, servicing, replacement, or otherwise management. The remote system 350 may determine a set of vehicles that correspond to the issue, and then transmit messages to each vehicle of the set of vehicles indicative of the issue. For example, if a sensor S is determined to be at risk for a performance issue, then remote system 350 may generate a list of vehicles (e.g., a list of vehicle identifiers) that correspond to the sensor S (e.g., vehicles that include the sensor S as specified by a model number, part number, date, location, or other information), determine a location of each vehicle (e.g., a network location, an address) and/or a user for each vehicle, and send notifications to the vehicle and/or user (e.g., via an application on a smart phone) of the issue with sensor S. In a further example, remote system 350 may identify a vehicle servicing entity that corresponds to each vehicle (e.g., the nearest vehicle servicer, or a set of potential servicers), and provide the servicer information to the user to facilitate the repair, replacement, or inspection. In a further example, remote system 350 may schedule a vehicle service appointment with servicer 370 based on the severity of the issue, the schedule of the user, the schedule of the servicer, the availability of replacement parts, the availability of vehicle data, any other suitable information, or any combination thereof. In a further example, remote system 350 may alert the vehicle to an issue, and vehicle manager 326 may then schedule a vehicle service appointment with servicer 370 based on the severity of the issue, the schedule of the user, the schedule of the servicer, the availability of replacement parts, the availability of vehicle data, any other suitable information, or any combination thereof.

Figure 4:
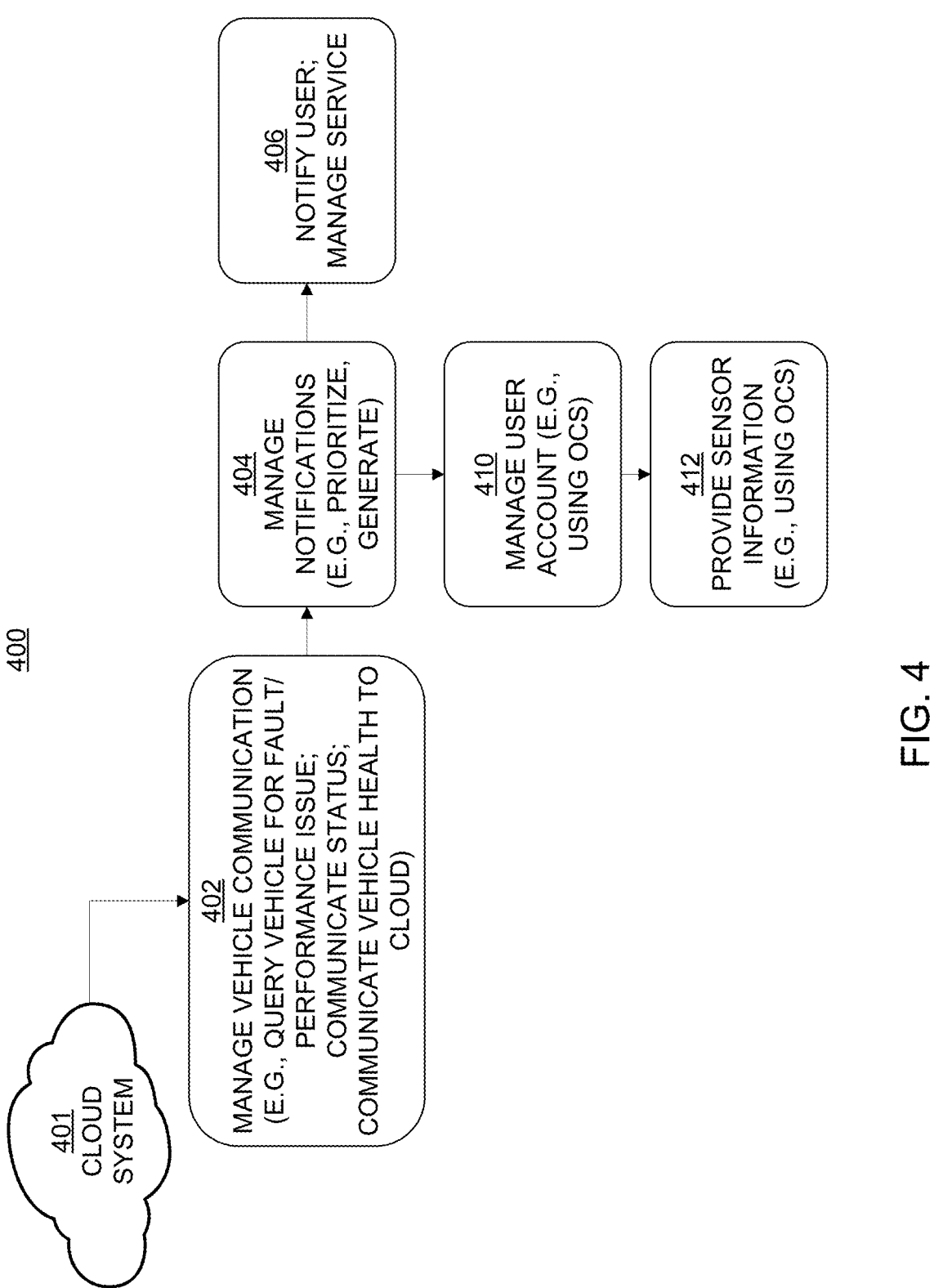
FIGS. 4-5 are flowcharts of illustrative processes for vehicle issue management, in accordance with some embodiments of the present disclosure.
Figure 5:
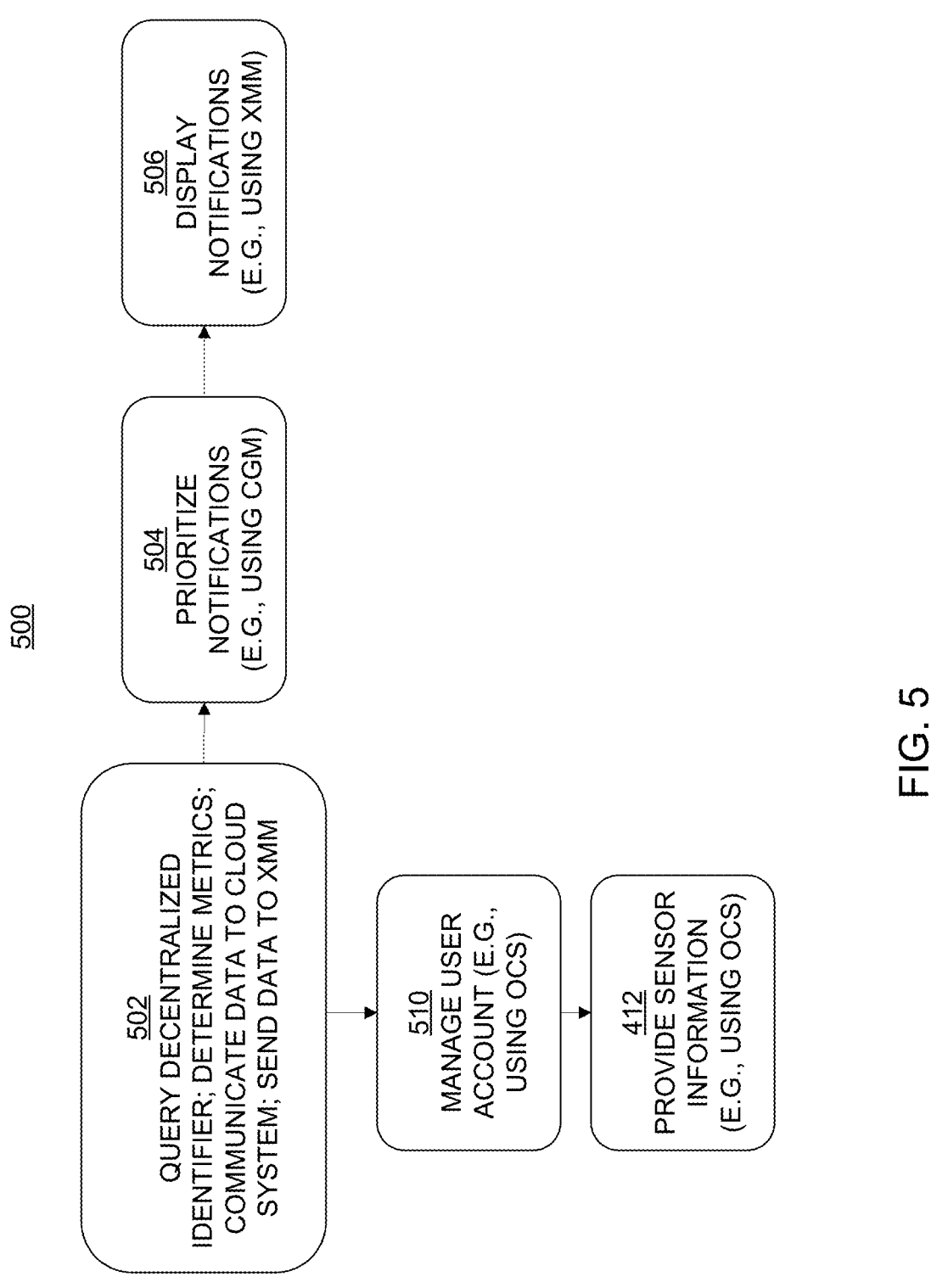

FIGS. 4-5 are flowcharts of illustrative processes for vehicle management, in accordance with some embodiments of the present disclosure. Processes 400 and 500 may be implemented using one or more devices (e.g., system 320 and remote system 350) arranged using any suitable communications architecture.

As illustrated in FIG. 4, cloud system 401 is configured to log vehicles that are affected by an issue, track vehicles affected by the issue, or otherwise manages a database of vehicles identifiers, servicing events or notifications, remedies, any other suitable information, or any combination thereof. At step 402, a thin client manager (TCM) may manage vehicle communications. For example, the TCM may generate a query for each vehicle for a fault issue and/or servicing issue, communicate vehicle information (e.g., a status) to an Extended Memory Manager (XMM), communicate vehicle health information (e.g., a vehicle diagnostic status) to cloud system 401, perform any other suitable operation, or any combination thereof. For example, at step 410, the TCM may send information to a virtual device manager (VDM), which may act as a gateway for an occupant classification sensor (OCS), which, at step 412, may provide sensor information (e.g., whether a seat is occupied, a classification of user occupying a seat). In a further example, at step 404, the TCM may be configured to manage notifications. For example, at step 404, the TCM may generate a notification for a computer graphics metafile (CGM), which may prioritize notifications. At step 406, an XMM may be configured to display user warnings, provide the user with time slots to have the servicing performed (e.g., to receive the vehicle, to service the vehicle), perform any other suitable operation, or any combination thereof. For example, a sensor S of a vehicle may have an associated calibration C stored in memory of the vehicle (e.g., in memory of an ECU of the vehicle). A vehicle manager may be configured to survey calibration values for a plurality of vehicles (e.g., all vehicles, all vehicles of a make/model, vehicles having sensor S), push the calibration survey data to a cloud system, and generates a notification if calibration values are out of specification (e.g., greater or less than one or more thresholds).

As illustrated in FIG. 5, at step 502, a TCM may manage query communications. For example, the TCM may query a Decentralized Identifier (DID), using the same trigger as a version scan, determine metrics (e.g., timing of triggers), communicate data to a cloud system (e.g., send DID values to a cloud system), analyze DID values (e.g., determine if gathered data within a predetermined range), send data (e.g., DID values) to XMM using a communications link, any other suitable actions, or any combination thereof. For example, a system may query a vehicle for sensor data gathered and stored, wherein the sensor response may include calibration values. Accordingly, based on the analyzed data (e.g., gathered based on signals using the calibration), the calibration may be evaluated (e.g., for updating or otherwise modification). For example, at step 504, the TCM may generate a notification for a computer graphics metafile (CGM), which may prioritize notifications (e.g., directed to a user or user account). At step 506, an XMM may be configured to display user warnings based on the notification (e.g., if the notification indicates a potential issue).

In an illustrative example, for each issue identified with one or more vehicles, survey data may be logged on the cloud system (e.g., data gathered automatically, data entered by one or more users). The cloud system, a user, or a combination thereof may identify potential vehicle issues or systemic issues. In response, the cloud system may determine a set of vehicles that may be affected by the issue, based on criteria such as serial number, manufacturing date, part numbers, vehicle or component identification number, geographic area, service history, vehicle operation diagnostics (e.g., from on-vehicle monitoring), any other suitable information, or any combination thereof. To illustrate, the TCM may query a suitable DID and receive a message response that may include message structure, data (e.g., calibration values, values of gathered data). The TCM may analyze the data (e.g., determine minimum and maximum vales and compare to thresholds or a band) to determine whether the data is within a range or otherwise indicative of an issue or absence of an issue.

In an illustrative example, a sensor (e.g., of sensors 331) may have corresponding calibration values and may generate a corresponding sensor signal that may be sampled and stored (e.g., in memory 325). The calibration values may correspond to a firmware version, a plurality of vehicles (e.g., stored in a databased, identified by VIN or other identifier), or otherwise be associated with a plurality of vehicles. The TCM may implement a sensor survey to cause the system to gather data (e.g., at a particular time or frequency, in response to an event, or otherwise collect data that may be analyzed for potential issues). In some embodiments, the TCM may cause a survey, test, or diagnostic to be performed one or more times (e.g., multiple times to confirm behavior of a subsystem, optionally based on a sensor signal). The TCM may compare the gathered data to reference information (e.g., an expected value or range) to determine whether calibration information is correct or otherwise requires an update. In some embodiments, the TCM may update calibration values and gather further data to determine whether the result is within an expected range (e.g., based on the reference information). In some embodiments, the TCM may communicate query responses to a cloud system for storage (e.g., to determine which vehicles may be affected).

Figure 6:
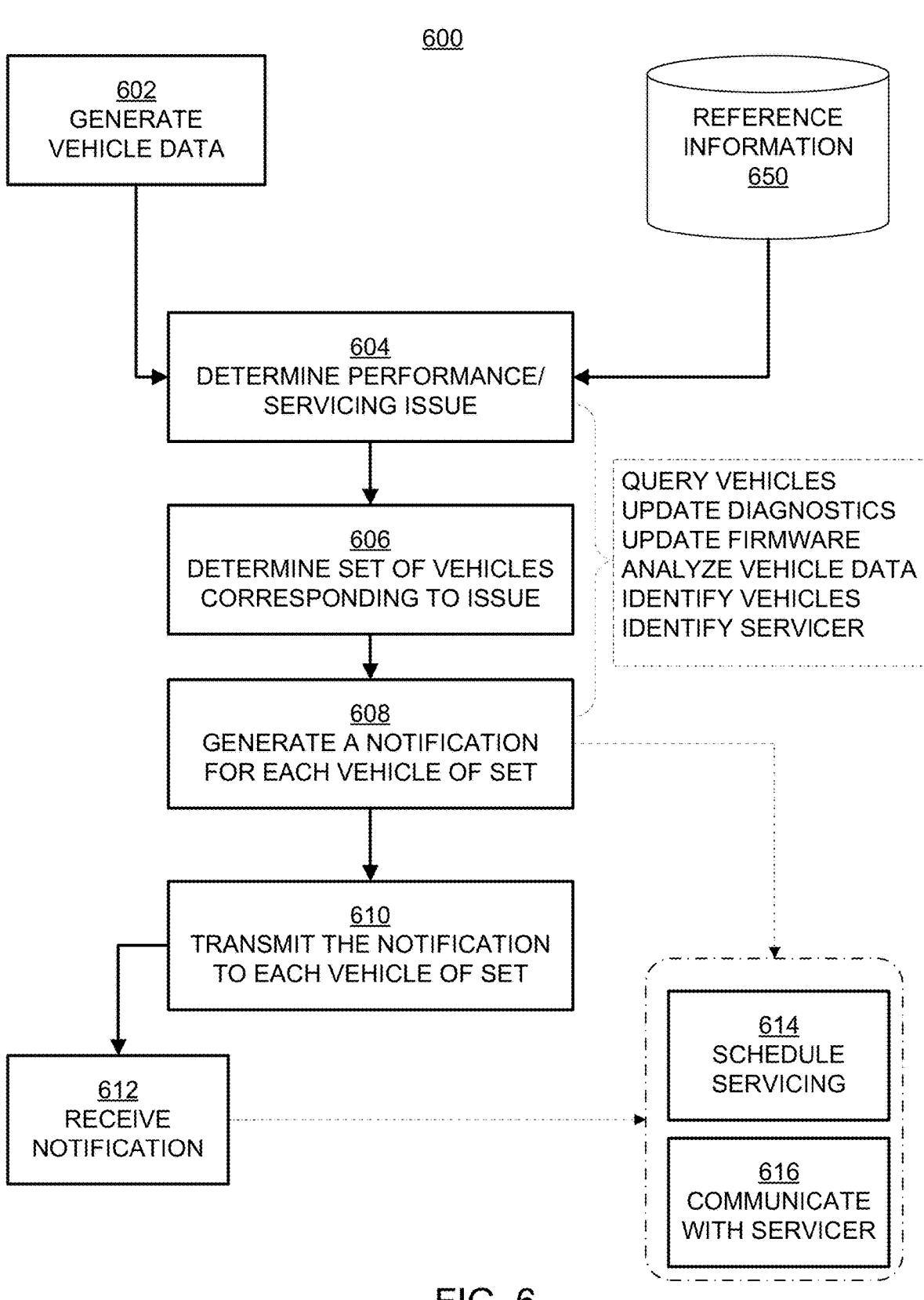
FIG. 6 is a flowchart of an illustrative process for managing vehicle notifications, in accordance with some embodiments of the present disclosure.

FIG. 6 is a flowchart of illustrative process 600 for managing vehicle notifications, in accordance with some embodiments of the present disclosure. For example, process 600 may be performed by remote system 350 (e.g., control circuitry 351 and comm interface 352 thereof) or cloud system 250, or a suitable combination of remote system 350, system 320, and servicer 370.

Step 602 includes generating vehicle data. In some embodiments, step 602 includes gathering sensor data, operation data, user input, any other suitable information, or any combination thereof by control circuitry of the vehicle and storing in memory. The data is stored locally (e.g., in memory hardware of the vehicle or an ECU thereof), in memory of a cloud system (e.g., the data may be uploaded to a cloud system using a network connection), in memory of a user device (e.g., as managed by an application of the user device), or a combination thereof.

Step 604 includes identifying or otherwise determining vehicle issues (e.g., potential performance issues), services issues (e.g., components needing checking or replacement), or both. In some embodiments, the cloud system determines vehicle and/or service issues by analyzing vehicle data of step 602 from a plurality of vehicles (e.g., some or all vehicles in the field, vehicles of a particular area, vehicles of a particular manufacturing date) and optionally reference information 650 (e.g., thresholds, ranges, calibrations, templates, historical data, service data, statistical values extracted from data). For example, step 604 may include identifying trends, patterns, or common issues and determining a potential vehicle issue. In a further example, step 604 may include reviewing and analyzing service tickets, debug tickets, log entries, or other documentation to determine actual, impending, or potential issues. In some embodiments, an algorithm (e.g., computer instructions stored in memory) may be implemented by a cloud system (e.g., a server or other network device) to analyze data as it is gathered in view of historical data, and generate a warning, notification, or flag if an issue is detected (e.g., the cloud system may function as a watchdog).

Step 606 includes determining a set of vehicles that are potentially affected by the issue determined at step 604. For example, step 606 may include determining VINs, serial numbers, part serial numbers, date ranges, geographic areas, part supplier identifiers, servicer identifiers, any other suitable information, or any combination thereof to link the issue to one or more vehicles. For example, a particular component installed over a particular time period and/or of a particular supplier and/or by a particular servicer may be identified as potentially having an issue. At step 606, the system may identify vehicles that correspond to the component (e.g., that have or likely have the component) in some suitable way, thus defining the set of vehicles. Because the cloud system has access to reference information 650 and vehicle data, the cloud system is configured to determine which vehicles should be flagged. In some embodiments, when a potential issue is identified, the cloud system queries each vehicle, or a relevant set of vehicles, to determine whether the potential issue applies to each vehicle. Accordingly, the cloud system can determine the set by querying vehicles for information.

Step 608 includes generating a notification for each vehicle of the set determined at step 606. The notification may be unique to each vehicle, a general message that is transmitted to each vehicle of the set, or a general message transmitted to each vehicle for which the cloud system has a record (e.g., all vehicles). The cloud system may provide the notification to the vehicle itself (e.g., to a communications interface and control circuitry of the vehicle), to a user device or account associated with the vehicle (e.g., to an app of a user device, or an email to the user account), or a combination thereof. Step 610 includes transmitting the notification to the vehicle, user device, and/or user account using network connection. For example, in some embodiments, the cloud system may transmit the notification based on the severity or type of the notification. Urgent vehicle issues may be transmitted to a user device (and optionally also the vehicle) to alert the user directly and quickly. Less urgent vehicle issues may be communicated to the vehicle, and the user may be notified when occupying the vehicle. Step 612 includes the vehicle, user device, or user account receiving the notification, generating a display or visual indication to the user, generating an alert, or otherwise providing the information to the vehicle and/or user. In some embodiments, the notification may also include warnings about vehicle operation, instructions, descriptive information of the vehicle issue, potential fixes (e.g., service issues), an indication of severity, servicing options, or a combination thereof.

Step 614 includes scheduling a vehicle servicing at a vehicle servicer. Step 616 includes communicating with the vehicle servicer. In some embodiments, when a service issue is identified, the cloud system notifies or queries one or more vehicle servicers (e.g., geographically nearby, specialized in a particular repair, on a predetermined list) to determine a time and date to schedule the servicing. In some embodiments, when a service issue is identified, the vehicle manager of the vehicle notifies or queries one or more vehicle servicers (e.g., geographically nearby, specialized in a particular repair, on a predetermined list) to determine a time and date to schedule the servicing. For example, when a vehicle receives a notification at step 612, the vehicle may provide a call button on a user interface for a user to call the servicer. In a further example, the vehicle may retrieve a calendar of appointment times/locations from the one or more servicers, present this information to the user, and receive a user selection of a servicing appointment. To illustrate, a vehicle issue may include a potential performance issue of a component or system, while the service issue may include the potential fix (e.g., testing, diagnosing, replacing, adjusting, or repairing the component or system).

In an illustrative example, as vehicles are serviced (e.g., the servicing issue is addressed), reference information may include indications of which vehicles have been fixed, fixes for a particular vehicle, or a combination thereof. Accordingly, process 600 may allow potentially affected vehicles to be identified and serviced, and then track the response to the issue.

In an illustrative example of process 600, control circuitry (e.g., of remote system 350) may be configured to determine a vehicle issue corresponding to at least one type of vehicle. The control circuitry may be configured to identify a plurality of vehicles of the at least one type that may include the vehicle issue (e.g., any of vehicles 201-205, or a vehicle associated with system 320). The control circuitry may be configured to query each vehicle of the plurality of vehicles as part of step 604 and/or 606, and then analyze query responses from the plurality of vehicles as part of step 604 and/or 606. Based on the query responses, the control circuitry may be configured to determine a set of vehicles from the plurality of vehicles subject to servicing based on the query responses (e.g., further as part of step 604 and/or 606). For example, for N vehicles of a particular type (e.g., make, model, year, and/or trim/option package), an issue may be identified with one or more of the vehicles. The issue may be identified during servicing, by communication from a user, from a vehicle (e.g., uploaded data or messages), from a vehicle servicer, or a combination thereof, from any suitable number of vehicles (e.g., a single vehicle, or multiple vehicles exhibiting the issue). In order to gather data, the control circuitry may query the N vehicles for additional operating data related to the issue (e.g., gathered from sensors, stored in memory, and transmitted to the control circuitry), and determine a subset M of the vehicles (e.g., M may be less than or equal to N) that may be subject to servicing (e.g., for which the issue applies, potentially applies, has arisen, or otherwise may be impacted). The control circuitry may then generate a notification for the M vehicles at step 608, and transmit the notification to users associated with the M vehicles (e.g., via email, voice message, or text message), user devices associated with the M vehicles (e.g., a smartphone), user accounts associated with the M vehicles (e.g., via a software application), communications interfaces of the M vehicles (e.g., and provided via a user interface), a third-party entity to then follow up with the users of the M vehicles, or a combination thereof, at step 610.

In a further illustrative example of process 600, at step 604, the control circuitry may analyze query responses by extracting data from each of the query responses, performing an analysis (e.g., a statistical analysis, a mathematical analysis, an algorithm, or any other suitable analysis) based on the data, and identify an issue based on the analysis. For example, if a component of the N vehicles may potentially cause vibration (e.g., due to reduced stiffness or loosening), the control circuitry may perform a spectral analysis of vibration information (e.g., gathered from transducers, accelerometers, or any other suitable sensors that may generate a signal indicative of vibration). In some embodiments, an issue may be identified by comparing a metric to a threshold. For example, if a detected temperature, pressure, current, voltage, or other suitable variable, or change thereof, exhibits a value outside of an expected range (e.g., exceeds or otherwise crosses a threshold), the control circuitry may identify the excursion (e.g., the control circuitry may identify the M vehicles based on the presence of an excursion). The gathered data may include time traces (e.g., sampled data, time-stamped data, or curve-fits thereof), statistical values (e.g., maximums, minimums, averages, medians, moments, variances, deviations, offsets, distributions, or variations thereof), state information (e.g., on/off, yes/no, or otherwise information regarding one or more discreet states of a subsystem or component), any other suitable data, or any combination thereof.

In a further illustrative example of process 600, at step 604, the control circuitry may identify an issue that may correspond to the at least one type of vehicle. The control circuitry may then, at step 606, query each vehicle of a plurality of vehicles, requesting data corresponding to the vehicle issue. The control circuitry may analyze the query responses from the plurality of vehicles by analyzing the data corresponding to the vehicle issue. For example, the control circuitry may analyze thermal behavior, flow behavior, electrical behavior, vibratory behavior, kinematic behavior, operational behavior, or a combination thereof.

In a further illustrative example of process 600, at step 604, control circuitry may identify a vehicle issue that corresponds to a subsystem of each vehicle of a plurality of vehicles. The control circuitry may, at step 606, analyze the query responses by analyzing data gather by at least one sensor of each vehicle corresponding to the subsystem. The control circuitry may then, also as part of step 606, identify a metric indicative of a potential malfunction associated with the subsystem, and determine the set of vehicles by comparing the data (e.g., received as part of query responses from each vehicle) and the metric. For example, the metric may include a value, an average value, a maximum or minimum value, a calculated value (e.g., a statistical calculation, integral calculation, difference calculation, function-based calculation, logic-based calculation, or a combination thereof). In a further example, the metric may include a value corresponding to a physical quantity such as a temperature, heat transfer rate, current flow, voltage, impedance, frequency, displacement, differences thereof, changes thereof, or any combination thereof. In a further example, the metric may include an extracted value based on data from one or more sensors using an algorithm, spectrum analysis, statistical analysis, any other suitable analysis, or any combination thereof.

In a further illustrative example of process 600, at step 604, control circuitry may transmit a firmware update to each vehicle. The firmware update may include instructions for processing data gathered by the vehicle. To illustrate, as vehicle issues are identified, an updated process for monitoring, diagnosing, or otherwise probing the issue using onboard sensors and systems may be used. Each vehicle may install and implement the firmware update to gather vehicle information. The control circuitry may receive query responses from each vehicle, with each query response including vehicle operating information. The control circuitry may provide a firmware update, additional instructions, or otherwise a framework for collecting data for each vehicle relevant to the identified vehicle issue.

In a further illustrative example of process 600, at step 608, 614 or 616, control circuitry may identify a servicing entity for one or more vehicles of the set of vehicles, and determine schedule information for servicing the one or more vehicles. For example, in some embodiments, the control circuitry may schedule servicing at step 614 based on availability of the servicer and user.

In a further illustrative example of process 600, control circuitry may transmit a notification indicative of the vehicle issue to each vehicle of the set of vehicles at step, and track vehicle servicing for each vehicle of the set of vehicles by storing servicing information as part of reference information 650 (e.g., reference information may be appended with servicing information).

In a further illustrative example of process 600, at step 606, control circuitry may determine a set of vehicles by identifying a set of user accounts corresponding to an identified vehicle issue. The control circuitry may then, at step 610, transmit a notification indicative of the vehicle issue to at least one device associated with each user account of the set, and track vehicle servicing for each vehicle corresponding to the set of user accounts (e.g., using reference information 650).

In a further illustrative example of process 600, at step 604, control circuitry may query each vehicle of a plurality of vehicles by gathering vehicle data corresponding to subsystems of each vehicle. The control circuitry may analyze the query responses by determining an issue at step 604 based on the gathered data, and then transmit a notification to each vehicle of the set indicative of the issue at step 610, and schedule a vehicle servicing at a vehicle servicer based on the issue for each vehicle of the set at step 614.

In some embodiments, process 600 is directed to managing vehicle issues and service issues. The system and methods may be implemented by control circuitry of the vehicle, a remote device (e.g., a cloud system, a server), or a combination thereof. For example, process 600 may improve the speed of informing a user of a vehicle issue, and the speed and precision of knowing and tracking how many vehicles (e.g., and which vehicles) have been affected and how many have been fixed, and allow saving resources (e.g., headcount) by having vehicle issues and/or service issues managed by an automatic process. For example, by managing the set of vehicles that receive notifications, the servicing and tracking may be performed more efficiently.

In some embodiments, the system (e.g., control circuitry of the vehicle, a cloud server) may include instructions for running a diagnostics function and/or algorithm to query and determine if an issue is present on a vehicle (e.g., step 604 applied to vehicle 100). In some embodiments, the system (e.g., control circuitry of the vehicle, a cloud server) may include instructions for running a diagnostics function and/or algorithm configured to automatically detect if the servicing has been performed (e.g., fixed) or otherwise addressed (e.g., step 602, or based on reference information 650).

In some embodiments, at step 602, control circuitry of a vehicle (e.g., vehicle 100) may monitor operation of the vehicle and identify malfunctioning components or systems, faulted components or systems, damaged components or systems, or otherwise flagged components or systems that require inspection, repair, servicing, or replacement. In some embodiments, at step 602, a communication system is configured to utilize the vehicles dash display (e.g., center display of interface 150 or input interface 330) to quickly inform the user that they are affected by the vehicle issue.

In some embodiments, a cloud system (e.g., cloud system 250) is configured to create and track a list of vehicles (e.g., stored in reference information 650) affected by a vehicle issue, determine if they have been fixed, or a combination thereof. For example, each vehicle has at least one associated identifier (e.g., a VIN, a serial number, a network address), and the cloud system may manage a database (e.g., reference information 650) of the vehicles, any vehicle issues that may affect the vehicles (e.g., for each vehicle), a status (e.g., fixed, not fixed, notified, scheduled), any other suitable information, or any combination thereof.

In some embodiments, an automatic service system (e.g., of cloud system 250) is configured to allow the user to call a vehicle servicer (e.g., vehicle servicer 270) via their vehicle (e.g., vehicle 100) and also automatically schedule a service for their vehicle to have the servicing performed (e.g., at step 616).

In an illustrative example, step 606 may include determining a part number, a batch number, a manufacturer date range, a manufacturing site, any other suitable identifying information, or any combination thereof, that may be used to link an issue with a set of vehicles. For example, step 608 may include querying each vehicle based on whether the vehicle has that part.

In an illustrative example, at step 604, the system may identify a potential gear-wear issue associated with a particular drivetrain. The system may query a plurality of vehicles (e.g., identified at step 606 as having the particular drivetrain), receive data from an encoder of an electric motor, and analyze the data to identify a signal or metric representative of the gear wear issue (e.g., vibrations may show up at a particular frequency band). To illustrate, a TCM may generate a DID query to gather data from vehicle encoders, and compare the gathered data to reference information to determine an issue is exhibited.

In an illustrative example, at step 604, the system may identify a potential thermal issue associated with an electric vehicle. The system may query a plurality of vehicles (e.g., identified at step 606 as having a particular battery pack, power electronics, or motor), receive data from one or more temperature sensors, and analyze the data to identify a signal or metric representative of the thermal issue (e.g., temperatures or time-differences in temperature may exceed a threshold). To illustrate, a TCM may generate a DID query to gather data from vehicle sensors, and compare the gathered data to reference information to determine an issue is exhibited.

Figure 7:
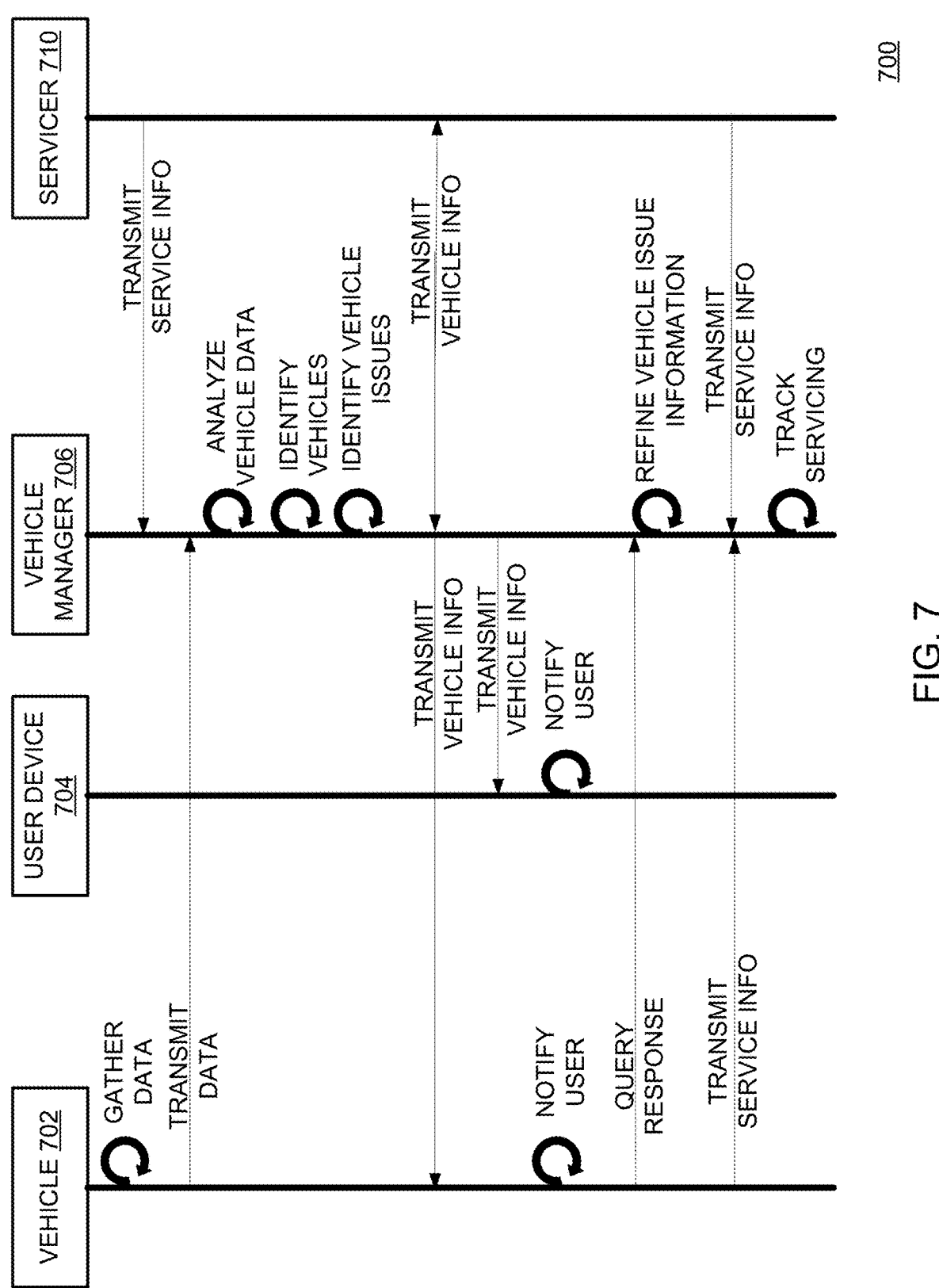
FIG. 7 is a flowchart of another illustrative process for managing vehicle notifications, in accordance with some embodiments of the present disclosure.

FIG. 7 is a flowchart of another illustrative process 700 for managing vehicle notifications, in accordance with some embodiments of the present disclosure. In some embodiments, process 700 includes at least some steps of process 600. Process 700 includes steps performed by vehicle 702, user device 704, vehicle manager 706 (e.g., which may be implemented on a vehicle, a user device, a cloud system, or a combination thereof), vehicle servicer 710, or a combination thereof, and any suitable interactions therebetween. For example, vehicle 702 may monitor one or more sensors, log operation information, log part numbers, log servicing records, or otherwise gather data, and transmit the data to vehicle manager 706. Vehicle servicer 710 may transmit service records or otherwise service information to vehicle manager 706, which may store and catalogue the information (e.g., by vehicle identifier, user account, or any other suitable identifier or index). In some embodiments, vehicle manager 706 (e.g., vehicle manager 706 may be implemented as an application executed by a cloud system) may analyze vehicle data (e.g., received from a DID query), servicing data, reference information, or a combination thereof to identify issues. Vehicle manager 706 (e.g., a TCM) may analyze vehicle data, identify an issue, identify vehicles or user accounts (or user devices) associated with the issue, and transmit vehicle information to the one or more vehicles 702, user accounts, user devices 704, vehicle servicers 710, or a combination thereof. The vehicle information may include a notification, which may be received by each vehicle 702, user account, or user device 704, which may then notify the user (e.g., via a display, notification, message, warning, selectable option of an interface). In some embodiments, the vehicle information may include a query, requesting vehicle data to determine whether the issue pertains to the vehicle. For example, vehicle manager 706 may identify a potential issue (e.g., by analyzing data using artificial intelligence, statistical analysis, or any other suitable technique), identify a plurality of vehicles (e.g., all vehicles, a set of vehicles), and then query the plurality of vehicles to determine if each vehicle includes a particular part (e.g., type, part number, manufacturer, install date), has had a particular servicing or issue, corresponds to an entry in a linked database, is associated with a particular user account (e.g., or a confirmation thereof), or has any other suitable attribute. In some embodiments, vehicle manager 706 may further refine the set of vehicles targeted for the servicing, or otherwise refine any suitable vehicle information, based on the query responses. As each vehicle 702 is serviced, the vehicle 702, servicer 710, or both may provide servicing information to vehicle manager 706 such that the servicing progress can be tracked.

Figure 8:
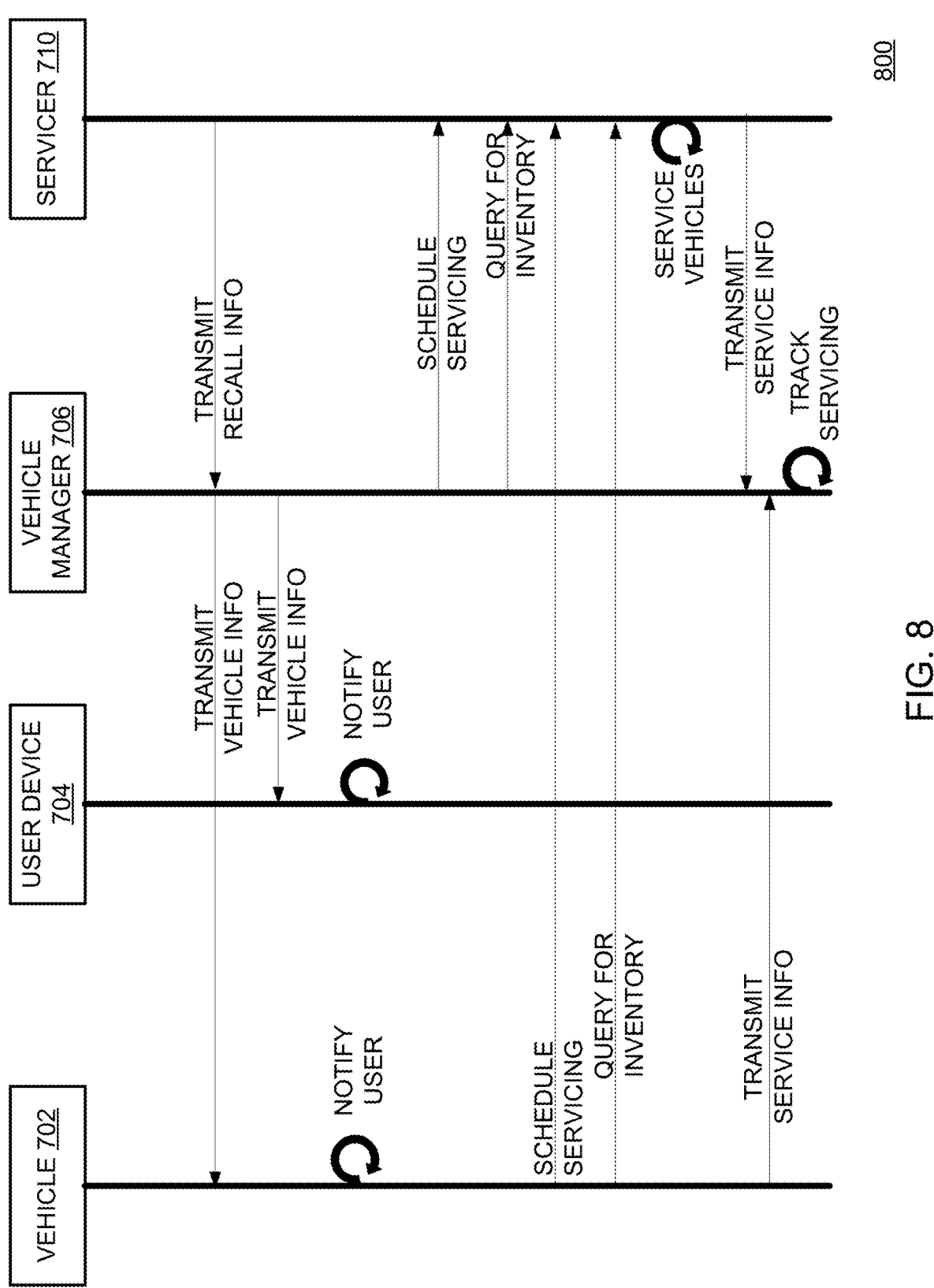
FIG. 8 is a flowchart of an illustrative process for managing vehicle servicing, in accordance with some embodiments of the present disclosure.

FIG. 8 is a flowchart of illustrative process 800 for managing vehicle servicing, in accordance with some embodiments of the present disclosure. In some embodiments, process 700 includes at least some steps of process 600. Process 800 includes steps performed by vehicle 702, user device 704, vehicle manager 706 (e.g., of a cloud system, a vehicle, or a combination thereof), vehicle servicer 710, or a combination thereof, and any suitable interactions therebetween. In some embodiments, vehicle manager 706 (e.g., vehicle manager 706 may be implemented as an application executed by a cloud system, as a TCM, or other suitable implementation) may analyze vehicle data, servicing data, reference information, or a combination thereof to identify issues, identify vehicles or user accounts (or user devices) associated with the issue, and transmit vehicle information to the one or more vehicles 702, user accounts, user devices 704, vehicle servicers 710, or a combination thereof. The vehicle information may include a notification, which may be received by each vehicle 702, user account, or user device 704, which may then notify the user (e.g., via a display, notification, message, warning, selectable option of an interface). Vehicle manager 706, vehicle 702, user device 704, or a combination thereof, may communicate with servicer 710 to query schedule information (e.g., an open appointment slot or time range), determine and/or reserve a time for servicing, query inventory information (e.g., to ensure replacement parts or repair tools are available), or a combination thereof, to manage servicing of vehicle 702 in response to the notification. As vehicles 702 are serviced by vehicle servicer 710, a log or record of the service is stored in memory such that the service progress can be tracked (e.g., vehicle manager 706). To illustrate, vehicle 702 or user device 704 may generate an interactive display for the user, and allow the user to call the vehicle servicer 710 directly (e.g., using a selectable soft button on a touchscreen) to schedule vehicle service to address the notification.

In an illustrative example, vehicle manager 706 may use artificial intelligence to identify patterns and potential issues. For example, based on the vehicle data (e.g., sensor data, part number data, usage data), reference information (e.g., thresholds, ranges, limits, profiles), and servicing information (e.g., repair logs, debug tickets), vehicle manager 706 may automatically identify potential issues, and estimate which subset of vehicles may be affected.

In an illustrative example, vehicle manager 706, vehicle 702, or user device 704 may query vehicle servicer 710 to determine available time slots, reserve time slots (e.g., for higher priority issues), or otherwise provide the availability to the user. For example, some issues may be fixed by sending out a service vehicle to the user's location, while for other issues, the vehicle would need to be brought to a repair location. In some embodiments, servicing information may include how the vehicle can be surfaced (e.g., located), and the system may suggest sending out a service vehicle to fix the issue while the user is parked for work or at night when/where the user prefers to park. In some embodiments, vehicles may be notified in batches based on how many vehicles are present in an area (e.g., a geographic area, a zip code, a city, a county, a neighborhood), how much inventory (e.g., of a particular component or tool) is available in that area, how many service slots are available, any other suitable servicing information, or any combination thereof. To illustrate, the system may retrieve scheduling information and then present the scheduling information to the user to contact the servicer, select a time slot, select a location for service, select a service option (e.g., fix at a later time/date such as during routine service), or otherwise interact with the vehicle servicer.

In an illustrative example, vehicle manager 706 may be configured to identify a subset of vehicles that actually have a problem, or potentially have a problem. For example, the is identification may be generally overly broad and not all vehicles actually have problems. Accordingly, cars are often brought in for manual inspection of the issue. In some embodiments, the present disclosure is directed to computer instructions (e.g., an algorithm) that can be downloaded and run on the vehicle to identify whether the vehicle really has the problem identified. This prevents wasted time, effort, and resources. For example, by determining a set of vehicles based on the issue, and optionally querying vehicles, the system may more efficiently manage an issue and servicing. In an illustrative example, in the context of a gear lash issue (e.g., exhibiting vibrations) an algorithm (e.g., vehicle information including a diagnostic test or data analysis instructions) may be downloaded to the vehicle to monitor motor dynamics to see if a gear lashing issue is present. The gathered data may be analyzed at the vehicle or transmitted to the vehicle manager for analysis. This way, unnecessary replacing/inspection may be avoided. If the gathered vehicle data does not indicate the gear lashing issue, then servicing need not be performed, while if the issue is identified in the gathered data, then servicing can be scheduled.

In an illustrative example, a system (e.g., system 320 or aspects thereof) associated with a vehicle (e.g., vehicle 702) includes a communications interface configured to communicate with a network system (e.g., vehicle manager 706) configured to communicate with a plurality of vehicles (e.g., similar to vehicle 702 in a suitable manner). The control circuitry may be configured to receive a query from the network system, determine vehicle information based on the query (e.g., including gathering data from onboard sensors), and transmit the vehicle information to the network system, which may compile and analyze the data (e.g., aggregate data from the plurality of vehicles of which vehicle 702 is one).

The foregoing is merely illustrative of the principles of this disclosure and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following illustrative embodiments.

What is claim is:

1. A method comprising:
identifying, using control circuitry, a plurality of vehicles that potentially include a vehicle issue;
in response to identifying the plurality of vehicles, transmitting instructions for performing a diagnostic test to each respective vehicle of the plurality of vehicles, wherein the instructions direct each respective vehicle to gather and store data related to the vehicle issue using an onboard sensor of the vehicle, and wherein the diagnostic test is performed by at least one electronic control unit (ECU) of each respective vehicle to identify the vehicle issue based on the gathered data;
receiving responses from the plurality of vehicles, wherein each response from each respective vehicle comprises the data gathered based on performing the diagnostic test, and wherein each response from each respective vehicle comprises a result from the diagnostic test indicative of whether the vehicle issue is present at the respective vehicle; and
transmitting a notification indicative of the vehicle issue to a set of vehicles of the plurality of vehicles based on the responses.

2. The method of claim 1, further comprising analyzing the responses by:
performing a statistical analysis based on the data; and
identifying a servicing issue based on the statistical analysis.

3. The method of claim 1, further comprising:
analyzing the data to identify the set of vehicles.

4. The method of claim 1, wherein:
the vehicle issue corresponds to a subsystem of each vehicle of the plurality of vehicles;
the method further comprises:
analyzing the data, wherein the onboard sensor corresponds to the subsystem; and
identifying a metric indicative of a potential malfunction associated with the subsystem; and
determining the set of vehicles by comparing the data and the metric.

5. The method of claim 1, wherein transmitting the instructions comprises transmitting a firmware update to each vehicle, wherein the firmware update comprises instructions for processing the data gathered by the vehicle, wherein each response comprises vehicle operating information.

6. The method of claim 1, further comprising:
identifying a servicing entity for one or more vehicles of the set of vehicles; and
determining schedule information for servicing the one or more vehicles.

7. The method of claim 1, further comprising:

tracking vehicle servicing for each vehicle of the set of vehicles.

8. The method of claim 1, further comprising:

identifying a set of user accounts corresponding to the vehicle issue;

transmitting, for each user account of the set, a notification indicative of the vehicle issue to at least one device associated with the user account; and tracking vehicle servicing for each vehicle corresponding to the set of user accounts.

9. The method of claim 1, wherein:

the responses comprise vehicle data corresponding to at least one subsystem of each vehicle;

analyzing the responses comprises identifying the vehicle issue corresponding to the set of vehicles; and the method further comprises scheduling, for each vehicle of the set, a vehicle servicing at a vehicle servicer based on the vehicle issue.

10. A system comprising:

control circuitry configured to:

identify a plurality of vehicles that may include a vehicle issue;

in response to identifying the plurality of vehicles, transmit instructions for performing a diagnostic test to identify the vehicle issue to each respective vehicle of the plurality of vehicles, wherein the instructions direct the respective vehicle to gather and store data related to the vehicle issue using an onboard sensor and at least one electronic control unit (ECU) of the vehicle, and wherein the instructions further comprise data analysis instructions performed by the at least one ECU of the vehicle to identify the vehicle issue based on the gathered data;

receive responses from the plurality of vehicles, wherein each response comprises the data gathered based on performing the diagnostic test, and wherein each response from each respective vehicle comprises results from the diagnostic test indicative of whether the vehicle issue is present at the respective vehicle; and transmit a notification indicative of the vehicle issue to a set of vehicles of the plurality of vehicles based on the responses.

11. The system of claim 10, wherein the control circuitry is further configured to analyze the responses by:

performing a statistical analysis based on the data; and identifying a servicing issue based on the statistical analysis.

12. The system of claim 10, wherein the control circuitry is further configured to:

analyze the data to identify the set of vehicles.

13. The system of claim 10, wherein:

the vehicle issue corresponds to a subsystem of each vehicle of the plurality of vehicles;

the control circuitry is further configured to:

analyze the data, wherein the onboard sensor corresponds to the subsystem;

identify a metric indicative of a potential malfunction associated with the subsystem; and determine the set of vehicles by comparing the data and the metric.

14. The system of claim 10, wherein the control circuitry is further configured to:

transmit the instructions by transmitting a firmware update to each vehicle, wherein the firmware update comprises instructions for processing the data gathered by the vehicle, wherein each response comprises vehicle operating information.

15. The system of claim 10, wherein the control circuitry is further configured to:

identify a servicing entity for one or more vehicles of the set of vehicles; and determine schedule information for servicing the one or more vehicles.

16. The system of claim 10, wherein the control circuitry is further configured to:

track vehicle servicing for each vehicle of the set of vehicles.

17. The system of claim 10, wherein the control circuitry is further configured to:

determine the set of vehicles by identifying a set of user accounts corresponding to the vehicle issue;

transmit, for each user account of the set, a notification indicative of the servicing to at least one device associated with the user account; and track vehicle servicing for each vehicle corresponding to the set of user accounts.

18. The system of claim 10, wherein the data corresponds to at least one subsystem of the respective vehicle, and wherein the control circuitry is further configured to:

analyze the responses by determining a servicing issue to address the vehicle issue;

transmit a notification to each vehicle of the set indicative of the servicing issue; and schedule, for each vehicle of the set, a vehicle servicing at a vehicle servicer.

* * * * *